United States Patent

Cooke

[11] Patent Number: 5,169,595
[45] Date of Patent: Dec. 8, 1992

[54] REACTOR CORE ISOLATION COOLING SYSTEM

[75] Inventor: Franklin E. Cooke, San Jose, Calif.

[73] Assignee: General Electric Company, San Jose, Calif.

[21] Appl. No.: 754,474

[22] Filed: Sep. 3, 1991

[51] Int. Cl.$^5$ ............................................. G21C 9/00
[52] U.S. Cl. .................................. 376/282; 376/299
[58] Field of Search ............... 376/282, 283, 298, 299

[56] References Cited

U.S. PATENT DOCUMENTS

| | | | |
|---|---|---|---|
| 4,818,475 | 4/1989 | Gluntz et al. | 376/282 |
| 5,008,069 | 4/1991 | Fredell | 376/299 |
| 5,011,652 | 4/1991 | Tominaga et al. | 376/283 |
| 5,021,212 | 6/1991 | Kataoka et al. | 376/283 |
| 5,059,385 | 10/1991 | Gluntz et al. | 376/282 |
| 5,082,619 | 1/1992 | Sawyer | 376/283 |
| 5,102,617 | 4/1992 | Gluntz et al. | 376/283 |

OTHER PUBLICATIONS

GE Nuclear Energy. "Advanced Boiling Water Reactor Standard Safety Analysis Report," Report No. 23A 6100, Sep. 29, 1987, Cover letter, cover page, pp. 5.2-5 and 6, 5.4-10 through 5.4-24, 6.3-iii, 6.3-1 through 6.3-9.1 and FIGS. 5.4-9 and 5.4-11.
Wilkins et al., "Advanced BWR: Design Improvements Build On Proven Technology," *Nuclear Engineering International* reprint Jun. 1986, pp. 1-7 and drawing in 6 sheets.

Primary Examiner—Donald P. Walsh
Assistant Examiner—Frederick H. Voss
Attorney, Agent, or Firm—Robert R. Schroeder

[57] ABSTRACT

A reactor core isolation cooling system includes a reactor pressure vessel containing a reactor core, a drywell vessel, a containment vessel, and an isolation pool containing an isolation condenser. A turbine is operatively joined to the pressure vessel outlet steamline and powers a pump operatively joined to the pressure vessel feedwater line. In operation, steam from the pressure vessel powers the turbine which in turn powers the pump to pump makeup water from a pool to the feedwater line into the pressure vessel for maintaining water level over the reactor core. Steam discharged from the turbine is channeled to the isolation condenser and is condensed therein. The resulting heat is discharged into the isolation pool and vented to the atmosphere outside the containment vessel for removing heat therefrom.

7 Claims, 1 Drawing Sheet

REACTOR CORE ISOLATION COOLING SYSTEM

The U.S. Government has rights in this invention in accordance with Contract No. DE-AC03-90SF18494 awarded by the Department of Energy.

TECHNICAL FIELD

The present invention relates generally to nuclear reactors, and, more specifically, to a reactor core isolation cooling system.

BACKGROUND ART

A conventional boiling water reactor includes a reactor core disposed in a reactor pressure vessel, with the reactor pressure vessel being disposed in a drywell vessel which in turn is disposed in a containment vessel. The pressure vessel includes an inlet feedwater line which channels water to the pressure vessel which is heated by the reactor core for generating steam. The steam is discharged from the pressure vessel through an outlet steamline to power a conventional turbine-driven generator for producing electrical power, for example.

Disposed in the containment vessel is a conventional suppression pool which includes a portion also within the drywell vessel with flow through the drywell vessel being provided by a plurality of horizontal vents therein. The suppression pool serves various conventional functions such as, for example, a heat sink and a condenser for any steam released in the drywell area.

In addition to the basic systems which control operation of the reactor, reactor auxiliary systems are provided which are used during normal and abnormal plant operation. Exemplary auxiliary systems include the reactor core isolation cooling (RCIC) system, the residual heat removal (RHR) system, the emergency core cooling system (ECCS), and the automatic depressurization system (ADS).

The RCIC system maintains sufficient water in the reactor pressure vessel to cool the reactor core in the event the vessel becomes isolated from feedwater flow and electrical power. A conventional RCIC system includes a turbine operatively joined to the pressure vessel steamline and a pump driven by the turbine which is operatively connected to the vessel feedwater line. In operation, the steam from the pressure vessel powers the turbine which in turn powers the pump for providing makeup water from a conventional condenstate storage tank or the suppression pool into the feedwater line for maintaining water level in the pressure vessel. The steam discharged from the turbine is channeled to the suppression pool which acts as a heat sink.

The RHR system includes one or more heat exchanges operatively connected to the suppression pool for removing heat therefrom which is added thereto by the RCIC system or by the condensation of steam therein for example.

The ADS is operated in conjunction with the ECCS to depressurize the pressure vessel by steam blowdown from the steamline through a conventional safety/relief depressurization valve which discharges steam into the suppression pool within the drywell vessel. The suppression pool, therefore, is heated by the blowdown steam, and the RHR system is then used for cooling the suppression pool.

The RHR system is considered an active heat removal system since it includes selectively positionable valves and powered pumps. Passive heat removal systems are being developed to reduce or eliminate the need for such active components for improving operation and reliability of the heat removal system. For example, two passive heat removal systems are disclosed in commonly assigned applications: "Passive Heat Removal From Nuclear Reactor Containment," Ser. No. 07/432,246, filed Nov. 6, 1989, now U.S. Pat. No. 5,082,619; and "Isolation Condenser Passive Cooling Of A Nuclear Reactor Containment," Ser. No. 07/519,070, filed May 4, 1990, now U.S. Pat. No. 5,059,385. In these two applications, an isolation pool containing an isolation condenser is provided at an elevation above a gravity driven coolant supply pool which in turn is disposed at an elevation above the suppression pool which is disposed above the reactor core. The isolation condenser includes an inlet line either directly joined to the reactor pressure vessel or having an open entry for receiving steam, and an outlet line having two branches for returning condensate and non-condensable gasses to the suppression pool, or the suppression pool and the supply pool. The respective elevations of the isolation pool, the supply pool, and the suppression pool are used for passively channeling water by gravity back into the reactor pressure vessel.

As indicated above, at least some of the reactor auxiliary systems are interrelated as well as including active components. In order to improve operation and reliability of the reactor plant, passive systems such as those referenced above are being considered, as well as others.

OBJECTS OF THE INVENTION

Accordingly, one object of the present invention is to provide a new and improved reactor core isolation cooling (RCIC) system.

Another object of the present invention is to provide an RCIC system which does not discharge waste heat into the suppression pool and containment vessel.

Another object of the present invention is to provide an RCIC system including a passive cooling system for discharging waste heat.

Another object of the present invention is to provide an RCIC system operatively joined with a passive containment cooling system.

DISCLOSURE OF INVENTION

A reactor core isolation cooling system includes a reactor pressure vessel containing a reactor core, a drywell vessel, a containment vessel, and an isolation pool containing an isolation condenser. A turbine is operatively joined to the pressure vessel outlet steamline and powers a pump operatively joined to the pressure vessel feedwater line. In operation, steam from the pressure vessel powers the turbine which in turn powers the pump to pump makeup water from a pool to the feedwater line into the pressure vessel for maintaining water level over the reactor core. Steam discharged from the turbine is channeled to the isolation condenser and is condensed therein. The resulting heat is discharged into the isolation pool and vented to the atmosphere outside the containment vessel for removing heat therefrom.

BRIEF DESCRIPTION OF DRAWINGS

The novel features characteristic of the invention are set forth and differentiated in the claims. The invention, in accordance with preferred and exemplary embodiments, together with further objects and advantages thereof, is more particularly described in the following detailed description taken in conjunction with the accompanying drawings in which:

MODE(S) FOR CARRYING OUT THE INVENTION

Figure 1:
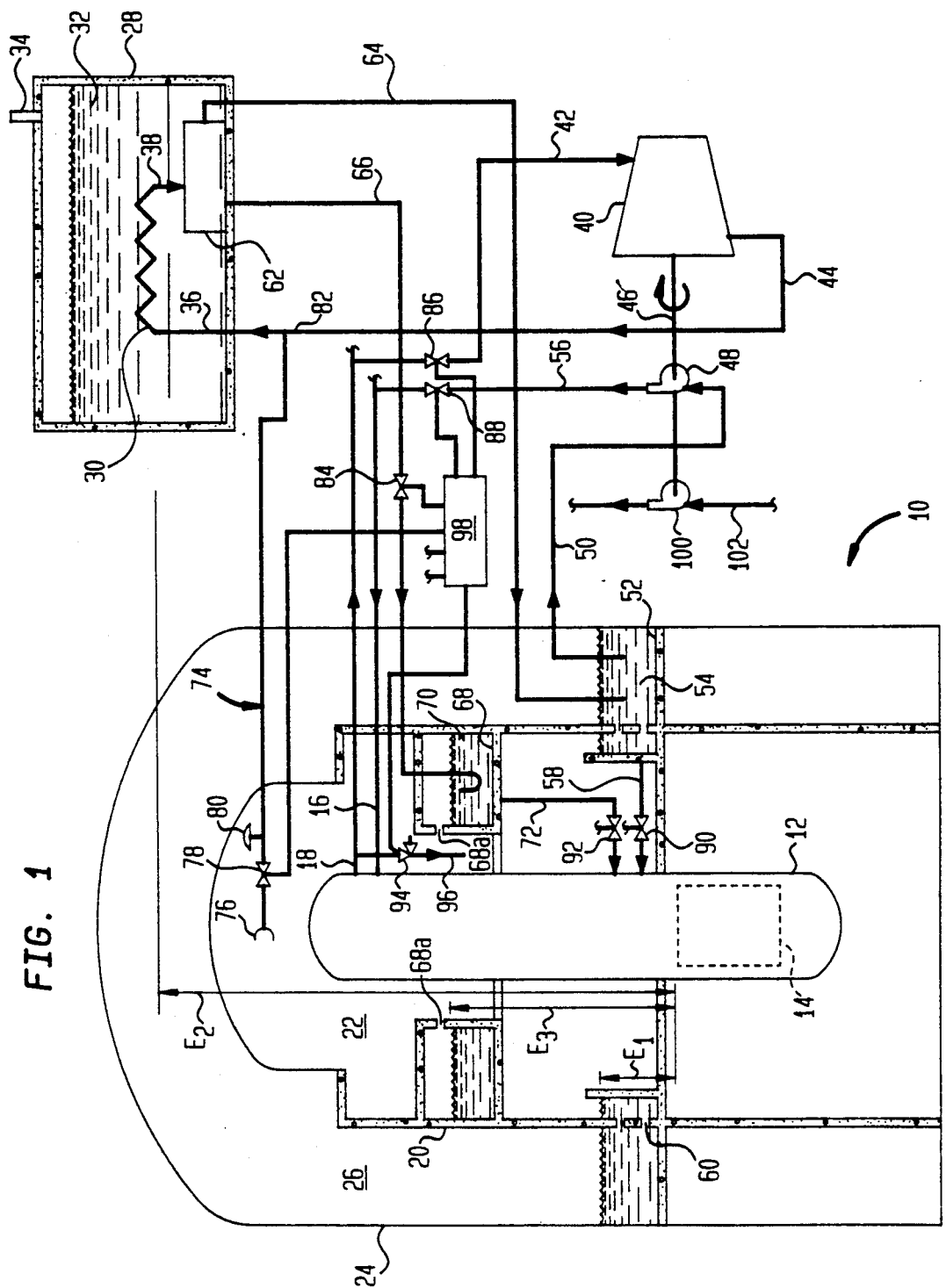
FIG. 1 is a schematic representation of a reactor core isolation cooling system in accordance with one embodiment of the present invention.

Illustrated schematically in FIG. 1 is a reactor core isolation cooling (RCIC) system 10 which includes a conventional reactor pressure vessel 12 containing a conventional nuclear reactor core 14 therein. The pressure vessel 12 is conventionally joined in flow communication with an inlet feedwater line 16 for channeling feedwater to cool the core 14. The pressure vessel 12 is joined also in flow communication with a conventional outlet steamline 18 for discharging from the pressure vessel 12 steam produced by heat generated from the reactor core 14.

As used herein, the term "line" refers to conventional conduits or pipes for channeling steam or water in the system 10.

A conventional annular drywell vessel 20 is spaced outwardly from the pressure vessel to define an open drywell plenum 22 and surrounds the pressure vessel 12. A conventional annular containment vessel 24 is spaced outwardly from the drywell vessel 20 to define an open containment plenum 26 and surrounds the drywell vessel 20.

The pressure vessel 12 and the reactor core 14 are in the form of a conventional boiling water reactor wherein a nominal high pressure of about 70 kg/cm$^2$ is maintained in the pressure vessel 12 during normal operation. Both the drywell vessel 20 and the containment vessel 24 are conventionally maintained at atmospheric pressure.

The system 10 further includes an isolation pool 28 containing a conventional isolation heat exchanger or condenser 30 submerged in isolation pool water 32. The isolation pool 28 includes a vent 34 disposed in flow communication with the atmosphere outside the containment vessel 24. The vent 34 is used to discharge to the atmosphere heat from the isolation water 32 removed from the condenser 30 during operation. The condenser 30 includes an inlet line 36 which channels steam to the condenser 30, and an outlet line 38 which discharges the steam cooled by the condenser 30 as condensate therefrom.

A conventional RCIC steam turbine 40 includes an inlet line 42 disposed in flow communication with the steamline 18 for selectively receiving steam from the pressure vessel 12. The turbine 40 also includes an outlet line 44 disposed in flow communication with the condenser inlet line 36 for discharging the steam from the turbine 40 to the condenser 30 for the cooling thereof by the isolation pool 28 which forms the condensate discharged from the condenser outlet line 38. The turbine 40 also includes a rotatable output shaft 46 which is operatively joined to a conventional first, or RCIC, pump 48. The first pump 48 includes an inlet line 50 disposed in flow communication with a conventional suppression pool 52 containing water 54 which is used for makeup as described below. An outlet line 56 is disposed in flow communication between the pump 48 and the feedwater line 16 for channeling the makeup water 54 to the pressure vessel 12. The first pump 48 may be joined to any suitable pool for providing the makeup water 54, but in the exemplary embodiment illustrated, the suppression pool 52 is preferred.

More specifically, the suppression pool 52 is conventional except that it is preferably disposed in the containment vessel 24 at an elevation above the reactor core 14 and includes an outlet line 58 disposed in flow communication with the pressure vessel 12 for allowing gravity to drain the makeup water 54 thereto. The suppression pool 52 is annular and includes a main portion disposed inside the containment vessel 24 in the plenum 26 and a minor portion disposed inside the drywell vessel in the plenum 22. A plurality of conventional horizontal vents 60 extend through the drywell vessel 20 in the suppression pool 52 for allowing flow of the makeup or suppression pool water 54 through the drywell vessel 20. The water 54 fills the suppression pool 52 to an elevation $E_1$ above the reactor core 14 to ensure that adequate pressure head is provided for allowing gravity to drain the water 54 into the pressure vessel 12 during a first, or RCIC, mode of operation upon suitable depressurization of the pressure vessel 12 as described in more detail below.

The isolation pool 28 is preferably disposed at an elevation above both the suppression pool 52 and the reactor core 14, with the condenser outlet line 38 being disposed in flow communication with the suppression pool 52. The condenser 30 is disposed at an elevation $E_2$ above the reactor core 14 to ensure that adequate pressure head is provided for allowing gravity to drain the condensate from the condenser 30 into the suppression pool 52.

A collector 62 in the exemplary form of a vessel is preferably submerged in the water 30 at the bottom of the isolation pool 28. The collector 62 is disposed in flow communication with the condenser outlet line 38, and includes a first outlet line 64 disposed in flow communication with the suppression pool 52, and a second outlet line 66 disposed in flow communication with a water supply pool 68 preferably disposed inside the drywell vessel 20 surrounding the pressure vessel 12. The pool 68 includes supply water 70 and is disposed at an elevation above the suppression pool 52 and the reactor core 14 and below the isolation pool 28. The supply pool 68 includes an outlet line 72 disposed in flow communication with the pressure vessel 12, and the water 70 in the supply pool 68 is disposed at an elevation $E_3$ above the reactor core to provide an adequate pressure head for allowing gravity to drain the supply water 70 into the pressure vessel 12 as described in further detail below. The supply pool 68 includes vents 68a inside the drywell plenum 22.

A cooling vent line 74 includes in serial flow communication an inlet 76 which is preferably an open end disposed inside the drywell vessel 20 in flow communication with the plenum 22, a first valve 78 for controlling flow through the line 74, a conventional relief diaphragm 80, and an outlet 82 disposed in flow communication with the condenser inlet line 36. A second valve 84 is disposed in flow communication in the collector second outlet line 66 for controlling the flow therethrough. A third valve 86 is disposed in flow communication in the turbine inlet line 42 for controlling flow therethrough, and a fourth valve 88 is disposed in flow communication in the pump outlet line 56. A fifth valve 90 is disposed in flow communication in the suppression pool outlet line 58, and a sixth valve 92 is disposed in flow communication in the supply pool outlet line 72 for respectively controlling flow therethrough.

A conventional depressurization valve 94 includes an inlet disposed in flow communication with the steamline 18 and an open-end outlet 96 disposed inside the drywell vessel 20 for discharging steam therefrom into the plenum 22 for depressurizating the pressure vessel 12 as described below.

A conventional electrical controller 98 is conventionally operatively connected to the respective valves 78, 84, 86, 88, 90, 92, and 94 for controlling the operation thereof.

More specifically, in a normal mode of operation of the reactor core 14, all of these valves are normally closed; the turbine 40 is inoperable; steam is channeled from the pressure vessel 12 through the steamline 18; and feedwater is channeled to the pressure vessel 12 through the feedwater line 16 in conventional fashion. In an RCIC, or first, mode of operation, the first and second valves 78 and 84 remain normally closed and the third and fourth valves 86 and 88 are selectively opened to channel steam from the steamline 18 to the turbine 40 to power the first pump 48. In this way, the first pump 48 draws makeup water 54 from the suppression pool 52 and pumps it into the feedwater line 16 into the pressure vessel 12 to maintain a suitable level of water therein above the reactor core 14 in conventional reactor core isolation cooling operation.

However, in accordance with one object of the present invention, steam is discharged from the turbine 40 through the outlet line 44 to the isolation condenser 30 wherein it is cooled and condensed by the isolation water 32, with the condensate then being channeled through the condenser outlet line 38 and to the collector 62. The relief diaphragm 80 is provided to limit the pressure to less than the design pressure of the isolation condenser 30. In this first mode of operation, the second valve 84 remains in its normally closed position and, therefore, the condensate is channeled solely through the collector first outlet line 64 to the suppression pool 52. In this way, waste heat from the turbine 40 is not channeled directly into the makeup water 54 in the suppression pool 52 as is conventionally done, but is instead dissipated in the isolation pool 28 and vented directly to the atmosphere outside the containment vessel 24 through the vent 34. Accordingly, the requirements for cooling the suppression pool 52 are reduced which results in an improved overall system.

In a passive containment cooling system (PCCS), or second, mode of operation, the first and second valves 78 and 84, which are preferably conventional explosive type valves, are selectively opened to allow steam dumped into the drywell vessel 20 to flow from the plenum 22, into the inlet 76 and through the cooling vent line 74 to the condenser inlet line 36 for cooling in the condenser 30. Steam may be dumped into the drywell vessel 20 by either a steamline break therein, or by conventional operation of the depressurization valve 94 for automatically depressurizing the pressure vessel 12. The depressurization valve 94 may be conventionally opened by the controller 98 in this mode of operation to dump steam from the pressure vessel 12 into the drywell vessel 20 for reducing the pressure in the pressure vessel 12. The dumped steam which enters the drywell plenum 22 is at an elevated pressure which drives it into the inlet 76 and through the vent line 74 to the condenser 30 wherein it is passively cooled.

Also in this second mode of operation, the condensate is discharged from the outlet line 38 into the collector 62 and any non-condensable gases therein, such as nitrogen for example, are separated from the condensate. This may be simply accomplished by joining the collector first outlet line 64 above the bottom inside surface of the collector 62 with the second outlet line 66 being joined to the bottom of the collector 62. In this way, the gases will flow into the first outlet line 64 and be channeled therethrough into the suppression pool 52. The cooled condensate is channeled through the second outlet line 66 into the supply pool 68. As described above, the isolation pool 28 is elevated above the supply pool 68 which in turn is elevated above the suppression pool 52 and the reactor core 14. In this way, gravity is used to passively channel or drain the condensate from the isolation condenser 30 through the collector second outlet line 66 and into the supply pool 68. The sixth valve 92 in the supply pool outlet line 72 is selectively opened by the controller 98 to allow the supply water 70 to flow into the pressure vessel 12 upon suitable reduction in pressure therein due to depressurization by the depressurization valve 94. The fifth valve 90 in the suppression pool outlet line 58 is also suitably opened to allow gravity to drain water from the suppression pool 52 into the pressure vessel 12 as desired for maintaining water above the reactor core 14.

In the RCIC or first mode of operation, the normally closed first valve 78 remains closed and prevents exhaust steam from the turbine 40 from flowing into the drywell vessel 20, which is instead channeled through the condenser 30 and condensed. The condensate is returned to the suppression pool 52 through the collector first outlet line 64 which replenishes the suppression pool 52 with a portion of the water initially vaporized in the pressure vessel 12 which is channeled through the steamline 18 and into the turbine inlet line 42.

In the PCCS or second mode of operation, the first valve 78 is open and the condensate formed in the condenser 30 from the steam dumped into the drywell vessel 20 and channeled through the inlet 76 is returned to the pressure vessel 12 through the collector second outlet line 66 by replenishing the supply water 70 in the supply pool 68 which is drained into the pressure vessel 12. Although the third and fourth valves 86 and 88 may remain normally closed in the PCCS or second mode of operation, they may be opened, in a combined RCIC and PCCS mode of operation, and operation of the turbine 40 and first pump 48 to provide makeup water to the pressure vessel 12 is not impaired even though the first valve 78 is open. The turbine 40 still powers the first pump 48 for channeling makeup water from the suppression pool 52 into the feedwater line 16. As long as a suitable pressure exists in the drywell vessel 20 to force dumped steam through the vent line 74 to the condenser 30, passive containment cooling will occur. However, as depressurization of the pressure vessel continues, and the dumped steam is cooled by the condenser 30, the pressure in the drywell plenum 22 will decrease over time with cooling by the isolation condenser 30 correspondingly decreasing as well. The turbine 40 may be operated at any time since the steam discharged therefrom through the outlet line 44 may be channeled through the condenser 30 for cooling, or it may be channeled into the drywell vessel 20 as backflow through the vent line 74 when the first valve 78 is open and the pressure within the drywell vessel 20 is suitably reduced after time.

However, although the RCIC function of the turbine 40 is preferably combined with the PCCS function using a common condenser 30 and the vent line 74, separate isolation condensers 30 may be used exclusively with the turbine 40 and the vent line 74, respectively. For example, the first valve 78 and the relief diaphragm 80 would be eliminated, with the vent line 74 joined to the condenser inlet line 36 of a first isolation condenser 30. The turbine outlet line 44 would not be joined to the first isolation condenser 30, but instead would be joined to a separate, duplicate isolation condenser 30 having an outline line 38 joined solely in flow communication with the suppression pool 52. The two isolation condensers 30 would, therefore, operate independently of each other, one with the turbine 40 for the RCIC function, and the other with the vent line 74 and pools 52, 68 for the PCCS function.

Although explosive type valves are preferred for the first and second valves 78 and 84, conventional check valves could also be used for preventing flow from the turbine outlet line 44 into the vent line 74 while allowing flow from the drywell vessel 20 through the vent line 74; and for preventing or limiting flow through the collector second outlet line 66 to the water supply pool 68 as required during the various modes of operation.

Since waste heat from the RCIC turbine 40 is discharged to the atmosphere through the isolation pool 28 and is not discharged into the containment vessel 24 as is conventionally done, the turbine can be additionally used to advantage to power additional devices such as an auxiliary pump 100 also operatively joined to the turbine output shaft 46. The auxiliary pump 100 is suitably joined in flow communication in an auxiliary flow loop 102 for pumping fluid as required. The additional energy required by the turbine 40 to power the auxiliary pump 100 in addition to the first pump 48 results in increased waste heat which may now be discharged directly to the atmosphere by the isolation pool 28, thusly eliminating system capacity to remove that heat if dumped into the containment vessel 24.

While there have been described herein what are considered to be preferred embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims.

I claim:

1. A reactor core isolation cooling system comprising:
    a reactor pressure vessel containing a reactor core therein joined in flow communication with an inlet feedwater line and an outlet steamline;
    a drywell vessel spaced outwardly from said pressure vessel;
    a containment vessel spaced outwardly from said drywell vessel;
    an isolation pool containing an isolation condenser submerged in isolation water, said isolation pool having a vent to atmosphere outside said containment vessel, and said condenser having an inlet line and an outlet line;
    a turbine disposed in flow communication with said steamline for receiving steam from said pressure vessel, a turbine outlet line disposed in flow communication with said condenser inlet line for discharging said steam from said turbine to said condenser for cooling thereof in said isolation pool and forming condensate discharged from said condenser outlet line, and a rotatable output shaft; and
    a pump operatively joined to said turbine output shaft, and including an inlet line disposed in flow communication with a pool containing makeup water, and an outlet line disposed in flow communication with said feedwater line for channeling said makeup water to said pressure vessel.

2. A system according to claim 1 wherein:
    said pool containing said makeup water is a suppression pool disposed in said containment vessel above said reactor core, and includes an outlet line disposed in flow communication with said pressure vessel for allowing gravity to drain said makeup water thereto; and
    said isolation pool is disposed above said suppression pool and said reactor core, and said condenser outlet line is disposed in flow communication with said suppression pool for allowing gravity to drain said condensate thereto.

3. A system according to claim 2 further including:
    a pool containing supply water disposed in said drywell vessel above said suppression pool and said reactor core and below said isolation pool, and including an outlet line disposed in flow communication with said pressure vessel for allowing gravity to drain said supply water thereto; and
    a collector disposed in flow communication with said condenser outlet line, and having a first outlet line disposed in flow communication with said suppression pool, and a second outlet line disposed in flow communication with said water supply pool.

4. A system according to claim 3 further including:
    a cooling vent line having in serial flow communication an inlet disposed inside said drywell vessel, a first valve, and an outlet disposed in flow communication with said condenser inlet line;
    a second valve disposed in flow communication in said collector second outlet line;
    said first and second valves being normally closed in a first mode of operation to allow said steam from said turbine to flow through said turbine outlet line and condense in said isolation condenser with said condensate then being channeled through said condenser outlet line, collector, and said collector first outlet line to said suppression pool; and
    said first and second valves being selectively openable in a second mode of operation to allow:
        steam dumped into said drywell vessel to flow through said cooling vent line to said condenser inlet line for cooling in said condenser; and
        said collector to channel said condensate through said second outlet line to said water supply pool, and gases in said condensate to be channeled through said first outlet line to said suppression pool.

5. A system according to claim 4 further including a depressurization valve having an inlet disposed in flow communication with said steamline and an outlet disposed inside said drywell vessel, said depressurization valve being normally closed and selectively openable to dump said dumped steam into said drywell vessel to depressurize said pressure vessel, said dumped steam being channeled through said cooling vent line to said isolation condenser.

6. A system according to claim 5 wherein said isolation pool is disposed outside said containment vessel.

7. A system according to claim 5 further including an auxiliary pump operatively joined to said turbine output shaft for pumping a fluid in an auxiliary flow loop.

* * * * *